US012517448B2

(12) United States Patent
Abe

(10) Patent No.: US 12,517,448 B2
(45) Date of Patent: Jan. 6, 2026

(54) DRUM UNIT INCLUDING PHOTOSENSITIVE DRUM, DRUM FRAME, AND PRESSURE MEMBER PRESSING DEVELOPING CARTRIDGE ATTACHED TO DRUM FRAME TOWARD PHOTOSENSITIVE DRUM

(71) Applicant: BROTHER KOGYO KABUSHIKI KAISHA, Nagoya (JP)

(72) Inventor: Koji Abe, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/644,818

(22) Filed: Apr. 24, 2024

(65) Prior Publication Data

US 2024/0402630 A1 Dec. 5, 2024

(30) Foreign Application Priority Data

May 30, 2023 (JP) ................................ 2023-088971

(51) Int. Cl.
*G03G 15/08* (2006.01)
*G03G 15/00* (2006.01)

(52) U.S. Cl.
CPC ..... *G03G 15/0813* (2013.01); *G03G 15/0808* (2013.01); *G03G 15/0812* (2013.01); *G03G 15/751* (2013.01)

(58) Field of Classification Search
CPC ........... G03G 21/1885; G03G 15/0863; G03G 15/751; G03G 15/0812; G03G 15/0808; G03G 15/0813
See application file for complete search history.

(56) References Cited

U.S. PATENT DOCUMENTS

| | | | |
|---|---|---|---|
| 10,725,424 | B1 | 7/2020 | Carpenter et al. |
| 2005/0053394 | A1 | 3/2005 | Ishii et al. |
| 2006/0029418 | A1 | 2/2006 | Ishii et al. |
| 2006/0029419 | A1 | 2/2006 | Shiraki |
| 2006/0029420 | A1 | 2/2006 | Ishii et al. |
| 2006/0029421 | A1 | 2/2006 | Ishii et al. |
| 2006/0029422 | A1 | 2/2006 | Shiraki |

(Continued)

FOREIGN PATENT DOCUMENTS

| | | |
|---|---|---|
| JP | 2005-049524 A | 2/2005 |
| JP | 2006-072284 A | 3/2006 |

(Continued)

*Primary Examiner* — Sevan A Aydin

(74) *Attorney, Agent, or Firm* — Merchant & Gould P.C.

(57) ABSTRACT

A drum unit includes: a photosensitive drum rotatable about a drum axis extending in a first direction; a drum frame to which a developing cartridge including a developing roller is attachable; and a pressure member. The drum frame includes a guide frame positioned at one end portion in the first direction of the drum frame. The guide frame has a guide groove allowing a portion of the developing cartridge to be inserted therein. The pressure member is provided at the guide frame at a position inward relative to the guide groove in the first direction. The pressure member is pivotally movable about a pressure axis extending in the first direction. The pressure member presses the developing cartridge toward the photosensitive drum in a state where the developing cartridge is attached to the drum frame.

13 Claims, 13 Drawing Sheets

(56) References Cited

U.S. PATENT DOCUMENTS

| | | | | |
|---|---|---|---|---|
| 2006/0029423 | A1 | 2/2006 | Shiraki | |
| 2007/0147888 | A1 | 6/2007 | Igarashi et al. | |
| 2007/0280733 | A1 | 12/2007 | Shiraki et al. | |
| 2008/0240778 | A1* | 10/2008 | Ishikawa ............ | G03G 15/0896 399/119 |
| 2009/0169257 | A1 | 7/2009 | Sato et al. | |
| 2010/0166453 | A1* | 7/2010 | Okabe ................ | G03G 15/0194 399/119 |
| 2010/0303477 | A1 | 12/2010 | Nakajima et al. | |
| 2011/0064463 | A1 | 3/2011 | Hashimoto et al. | |
| 2012/0107014 | A1* | 5/2012 | Takakuwa .......... | G03G 21/1647 399/119 |
| 2012/0163859 | A1 | 6/2012 | Hashimoto et al. | |
| 2012/0269547 | A1 | 10/2012 | Kishi | |
| 2012/0308259 | A1* | 12/2012 | Abe ................... | G03G 21/1619 399/119 |
| 2013/0051851 | A1 | 2/2013 | Fukamachi | |
| 2015/0192894 | A1 | 7/2015 | Noda et al. | |
| 2017/0269504 | A1 | 9/2017 | Abe et al. | |
| 2019/0302681 | A1 | 10/2019 | Wang et al. | |
| 2020/0301345 | A1* | 9/2020 | Suzuki ............... | G03G 21/1842 |
| 2021/0034003 | A1* | 2/2021 | Kubo ..................... | G03G 15/50 |

FOREIGN PATENT DOCUMENTS

| | | | |
|---|---|---|---|
| JP | 2007-199652 | A | 8/2007 |
| JP | 2007-322553 | A | 12/2007 |
| JP | 2009-162905 | A | 7/2009 |
| JP | 2009-181021 | A | 8/2009 |
| JP | 2010-276962 | A | 12/2010 |
| JP | 2011-059511 | A | 3/2011 |
| JP | 2012-226278 | A | 11/2012 |
| JP | 2013-050493 | A | 3/2013 |
| JP | 2013-092806 | A | 5/2013 |
| JP | 2015-129816 | A | 7/2015 |
| JP | 2015-129817 | A | 7/2015 |
| JP | 2017-167290 | A | 9/2017 |
| JP | 2019-179129 | A | 10/2019 |

* cited by examiner

DRUM UNIT INCLUDING PHOTOSENSITIVE DRUM, DRUM FRAME, AND PRESSURE MEMBER PRESSING DEVELOPING CARTRIDGE ATTACHED TO DRUM FRAME TOWARD PHOTOSENSITIVE DRUM

REFERENCE TO RELATED APPLICATIONS

This application claims priority from Japanese Patent Application No. 2023-088971 filed on May 30, 2023. The entire content of the priority application is incorporated herein by reference.

BACKGROUND ART

There has been known a conventional electrophotographic type image forming apparatus such as a laser printer or an LED printer. The conventional image forming apparatus includes a developing cartridge including a developing roller, and a drum unit (a process frame) including a photosensitive drum. The developing cartridge is attachable to the drum unit. The drum unit to which the developing cartridge is attached is attachable to a main body of the image forming apparatus.

SUMMARY

Upon attachment of the developing cartridge to the drum unit, the developing roller contacts the photosensitive drum. In the meantime, the drum unit also includes a pressure member for pressing the developing cartridge toward the photosensitive drum. However, in a case where the pressure member is provided at an end portion of the drum unit, a space for providing components other than the pressure member is reduced at the end portion of the drum unit.

In view of the foregoing, it is an object of the present disclosure to provide a drum unit including a pressure member for pressing a developing cartridge toward a photosensitive drum, and capable of ensuring a large space for providing components other than the pressure member at an end portion of the drum unit.

In order to attain the above and other object, the present disclosure provides a drum unit including: a photosensitive drum; a drum frame to which a developing cartridge including a developing roller is attachable; and a pressure member. The photosensitive drum is rotatable about a drum axis extending in a first direction. The drum frame includes a guide frame. The guide frame is positioned at one end portion in the first direction of the drum frame. The guide frame has a guide groove allowing a portion of the developing cartridge to be inserted therein. The pressure member is positioned at the guide frame at a position inward relative to the guide groove in the first direction. The pressure member is pivotally movable about a pressure axis extending in the first direction. The pressure member presses the developing cartridge toward the photosensitive drum in a state where the developing cartridge is attached to the drum frame.

In the above structure, the pressure member is positioned inward relative to the guide groove in the first direction. With this arrangement, a large space for providing components other than the pressure member can be ensured at the one end portion in the first direction of the drum frame.

DESCRIPTION

Hereinafter, one embodiment of the present disclosure will be described while referring to the accompanying drawings.

In the following description, a direction in which drum axes of photosensitive drums extend will be referred to as "first direction". Further, a direction in which a pressure member of a drum unit and a housing of a developing cartridge face each other in a state where the developing cartridge is attached to a drum frame will be referred to as "second direction". Still further, a direction in which one end portion of the drum frame at which the photosensitive drums are positioned and another end portion of the drum frame are arranged will be referred to as "third direction".

The first direction and the second direction cross each other. Preferably, the first direction and the second direction are orthogonal to each other. The second direction and the third direction cross each other. Preferably, the second direction and the third direction are orthogonal to each other. The third direction and the first direction cross each other. Preferably, the third direction and the first direction are orthogonal to each other.

1. CONFIGURATION OF IMAGE FORMING APPARATUS

Figure 1:
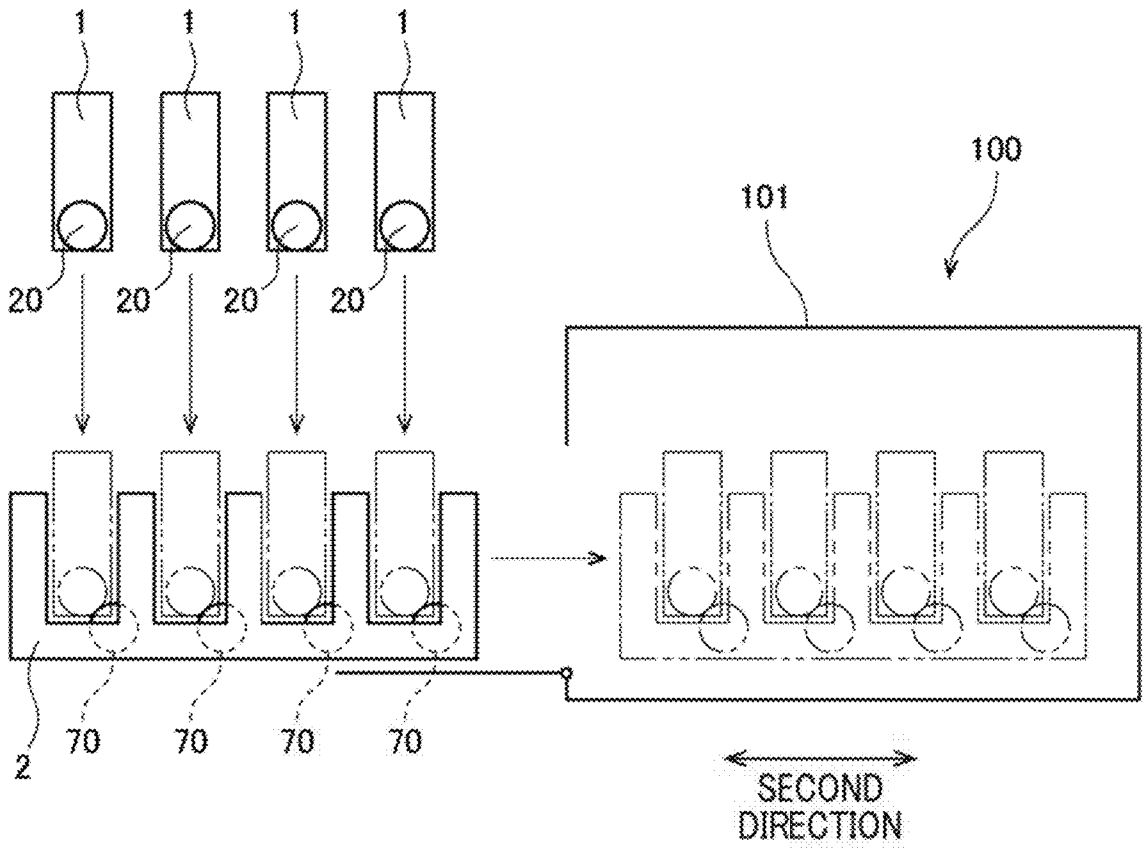
FIG. 1 is a schematic view of an image forming apparatus.

FIG. 1 is a schematic view of an image forming apparatus 100. The image forming apparatus 100 is an electrophotographic type printer. Specifically, the image forming apparatus 100 is a laser printer or an LED printer. As illustrated in FIG. 1, the image forming apparatus 100 includes a main frame 101, a drum unit 2, and four developing cartridges 1.

The four developing cartridges 1 are attachable to the drum unit 2. Also, the drum unit 2 to which the four developing cartridges 1 are attached is attachable to the main frame 101. As a result of movement in the second direction of the drum unit 2 relative to the main frame 101, attachment of the drum unit 2 to the main frame 101 is completed.

In a state where the four developing cartridges 1 are attached to the drum unit 2, the four developing cartridges 1 are arranged in the second direction in the order of the developing cartridge 1 accommodating therein toner of yellow, the developing cartridge 1 accommodating therein toner of magenta, the developing cartridge 1 accommodating therein toner of cyan, and the developing cartridge 1 accommodating therein toner of black, for example. The image forming apparatus 100 is configured to print an image on a surface of a printing paper using toner supplied from the developing cartridges 1.

2. CONFIGURATION OF DEVELOPING CARTRIDGE

Figure 2:
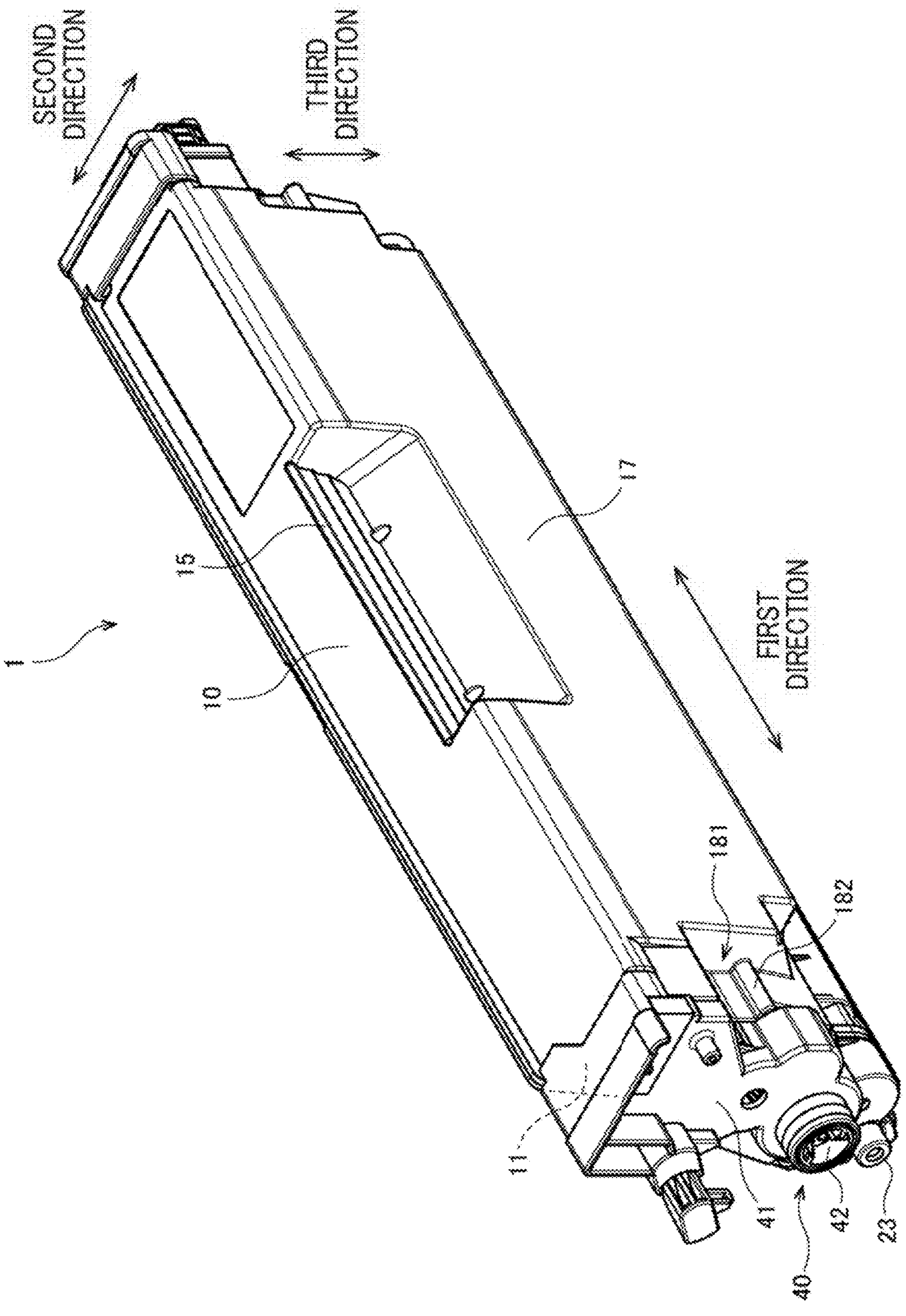
FIG. 2 is a perspective view of a developing cartridge.
Figure 3:
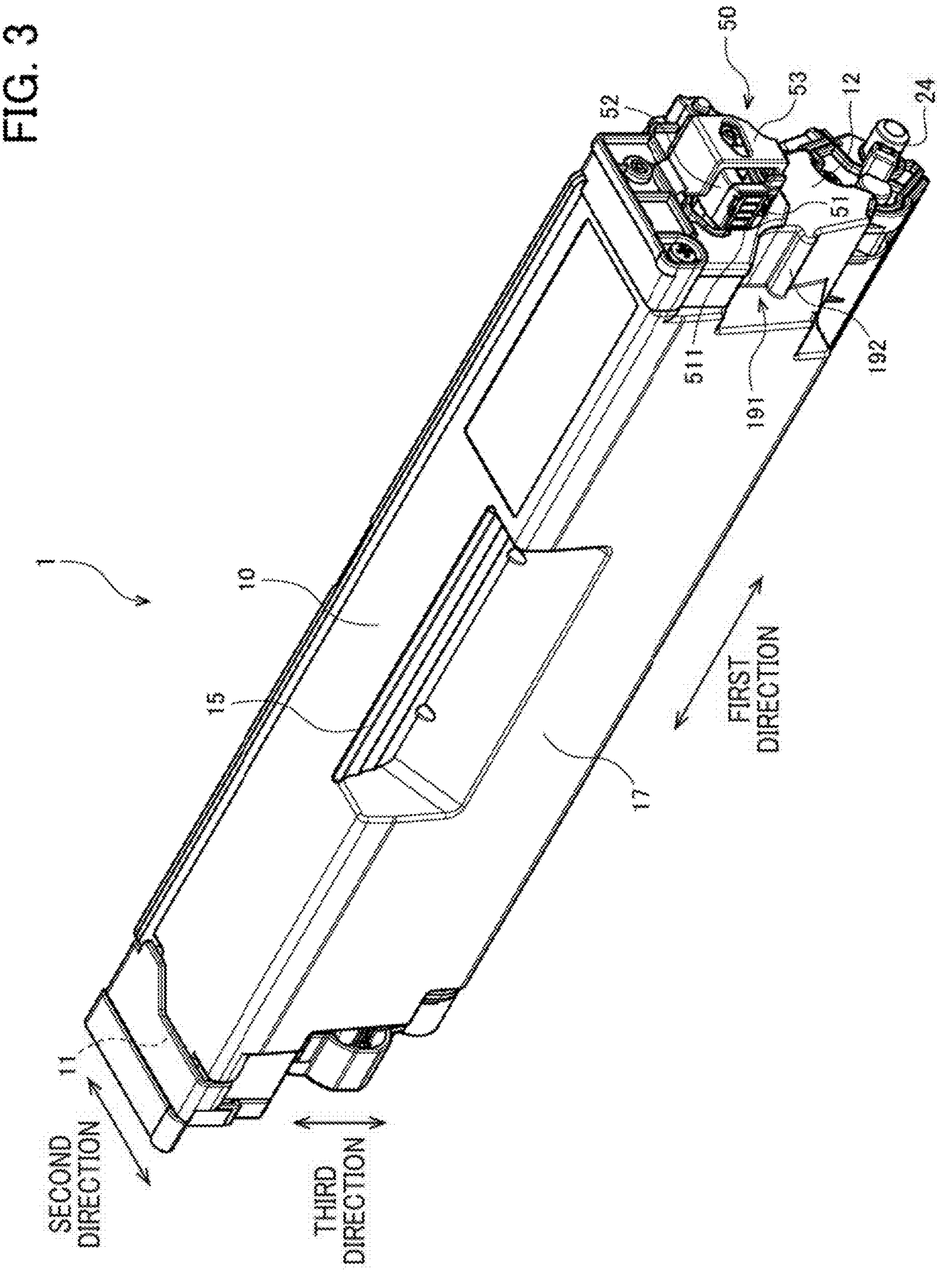
FIG. 3 is another perspective view of the developing cartridge.
Figure 4:
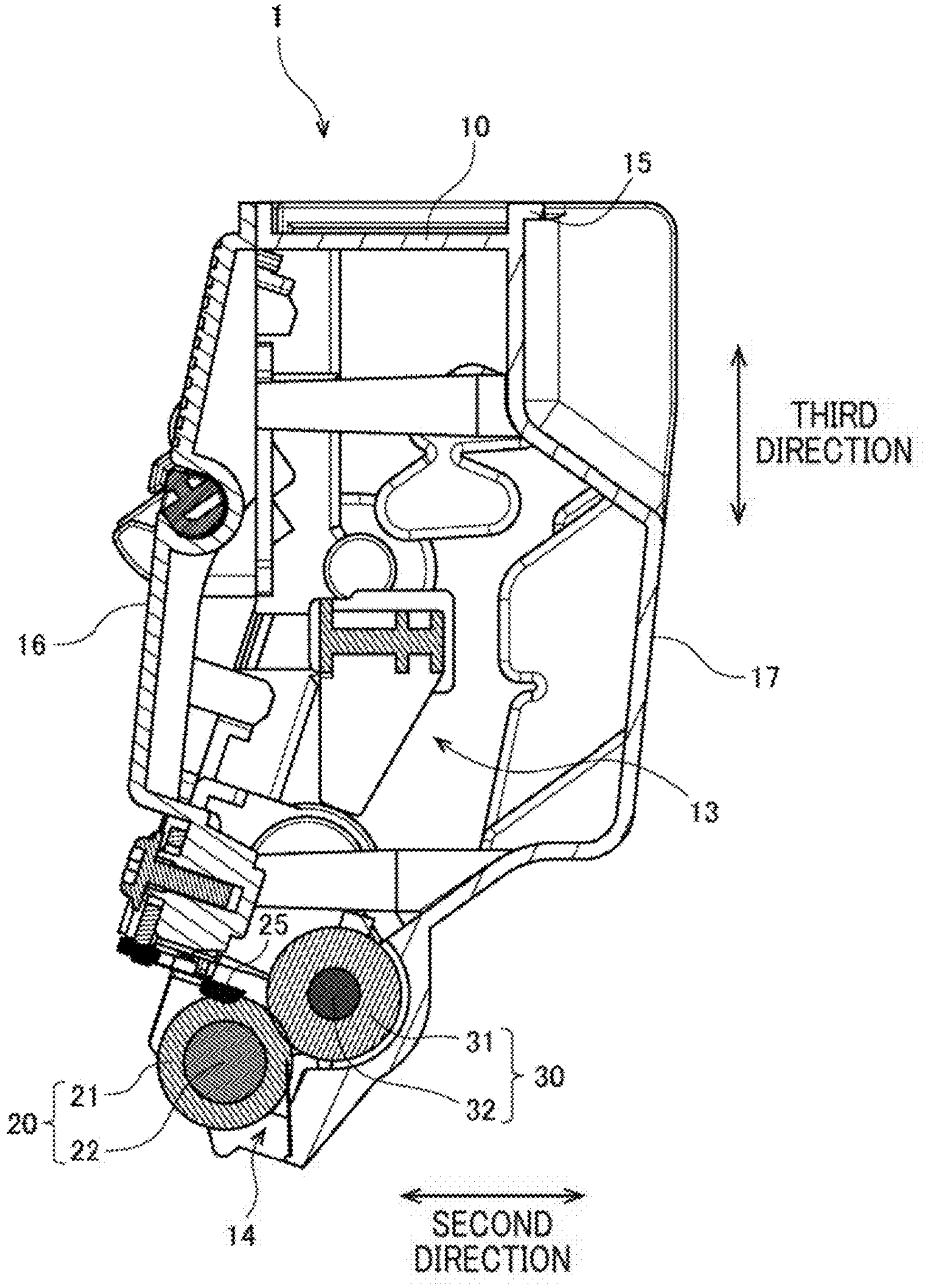
FIG. 4 is a cross-sectional view of the developing cartridge taken along a plane orthogonal to a first direction.

FIGS. 2 and 3 are perspective views of the developing cartridge 1. FIG. 4 is a cross-sectional view of the developing cartridge 1 taken along a plane orthogonal to the first direction. As illustrated in FIGS. 2 to 4, the developing cartridge 1 includes a housing 10, a developing roller 20, a supply roller 30, a gear portion 40, and a memory assembly 50.

<2-1. Housing>

The housing 10 is a container configured to accommodate toner therein. The housing 10 has a first end face 11, and a second end face 12. The first end face 11 is positioned at one end portion in the first direction of the housing 10. The second end face 12 is positioned at another end portion in the first direction of the housing 10. The first end face 11 and the second end face 12 are spaced apart from each other in the first direction.

An accommodation chamber 13 is formed inside the housing 10. Toner is accommodated in the accommodation chamber 13. As illustrated in FIG. 4, the housing 10 also has an opening 14. The opening 14 is positioned at one end portion in the third direction of the housing 10. An outer space of the housing 10 and the accommodation chamber 13 are in communication with each other via the opening 14. As illustrated in FIGS. 2 through 4, the housing 10 includes a handle 15. The handle 15 is positioned at another end portion in the third direction of the housing 10.

The housing 10 also has a first outer surface 16, and a second outer surface 17. The first outer surface 16 is positioned at one end portion in the second direction of the housing 10. The second outer surface 17 is positioned at another end portion in the second direction of the housing 10. The first outer surface 16 and the second outer surface 17 are spaced apart from each other in the second direction. The opening 14 is positioned closer to the first outer surface 16 than to the second outer surface 17 in the second direction.

The housing 10 has a first recess 181, and includes a first protrusion 182. The first recess 181 and the first protrusion 182 are positioned at one end portion in the first direction of the second outer surface 17. The first recess 181 is recessed in the second direction from the second outer surface 17 toward the first outer surface 16. The first protrusion 182 protrudes from the first recess 181 in the second direction so as to extend in a direction away from the first outer surface 16. In a state where the developing cartridges 1 are attached to the drum unit 2, the first protrusion 182 of each developing cartridge 1 protrudes in the second direction toward a corresponding first pressure member 91 (described later) of the drum unit 2. The first protrusion 182 is an example of the "protrusion".

Similarly, the housing 10 has a second recess 191, and includes a second protrusion 192. The second recess 191 and the second protrusion 192 are positioned at another end portion in the first direction of the second outer surface 17. The second recess 191 is recessed in the second direction from the second outer surface 17 toward the first outer surface 16. The second protrusion 192 protrudes from the second recess 191 in the second direction so as to extend in a direction away from the first outer surface 16. In a state where the developing cartridges 1 are attached to the drum unit 2, the second protrusion 192 of each developing cartridge 1 protrudes in the second direction toward a corresponding second pressure member 92 (described later) of the drum unit 2. The second protrusion 192 is also an example of the "protrusion".

<2-2. Developing Roller>

The developing roller 20 is a roller rotatable about a developing axis extending in the first direction. The developing roller 20 is positioned at the opening 14 of the housing 10. That is, the developing roller 20 is positioned at the one end portion in the third direction of the housing 10.

The developing roller 20 includes a developing roller body 21, and a developing shaft 22. The developing roller body 21 is a hollow cylindrical member extending in the first direction. The developing roller body 21 is made of rubber having elasticity, for example. The developing shaft 22 has a solid cylindrical shape and extends in the first direction to penetrate the developing roller body 21 in the first direction. The developing roller body 21 is fixed to the developing shaft 22. The developing shaft 22 is made of metal or resin having electrical conductivity.

One end portion in the first direction of the developing shaft 22 is coupled to a developing roller gear (not illustrated) included in the gear portion 40. Another end portion in the first direction of the developing shaft 22 is supported by the second end face 12 of the housing 10 via a bearing (not illustrated). In accordance with rotation of the developing roller gear, the developing roller body 21 and the developing shaft 22 rotate about the developing axis. As a result, toner accommodated in the housing 10 is carried on an outer circumferential surface of the developing roller body 21.

As illustrated in FIGS. 2 and 3, the developing cartridge 1 also includes a first collar 23, and a second collar 24. The first collar 23 is attached to the one end portion in the first direction of the developing shaft 22, whereas the second collar 24 is attached to the other end portion in the first direction of the developing shaft 22. Each of the first collar 23 and the second collar 24 has a hollow cylindrical outer circumferential surface centered on the developing axis. Each of the first collar 23 and the second collar 24 may be rotatable about the developing axis relative to the developing shaft 22. The first collar 23 and the second collar 24 are each an example of the "portion of the developing cartridge".

As illustrated in FIG. 4, the developing cartridge 1 further includes a blade 25. The blade 25 is positioned at the opening 14. The blade 25 is a plate having elasticity. One end portion of the blade 25 is attached to the housing 10. Another end portion of the blade 25 contacts an outer circumferential surface of the developing roller 20. More specifically, the other end portion of the blade 25 contacts toner carried on the outer circumferential surface of the developing roller 20. The blade 25 extends in the first direction along the outer circumferential surface of the developing roller 20. The blade 25 is configured to regulate toner carried on the outer circumferential surface of the developing roller 20 so that the toner on the outer circumferential surface of the developing roller 20 has a prescribed thickness.

<2-3. Supply Roller>

The supply roller 30 is a roller rotatable about a supply axis extending in the first direction. The supply roller 30 is positioned inside the housing 10. The supply roller 30 includes a supply roller body 31, and a supply shaft 32.

The supply roller body 31 is a hollow cylindrical member extending in the first direction. The supply roller body 31 is made of rubber having elasticity, for example. An outer circumferential surface of the supply roller body 31 is in contact with the outer circumferential surface of the developing roller body 21. The supply shaft 32 has a solid cylindrical shape and extends in the first direction to penetrate the supply roller body 31 in the first direction. The supply roller body 31 is fixed to the supply shaft 32. The supply shaft 32 is made of metal or resin having electrical conductivity.

One end portion in the first direction of the supply shaft 32 is coupled to a supply roller gear (not illustrated) included in the gear portion 40. Another end portion in the first direction of the supply shaft 32 is supported by the second end face 12 of the housing 10 via a bearing (not illustrated). In accordance with rotation of the supply roller gear, the supply roller body 31 and the supply shaft 32 rotate about the supply axis. Toner accommodated in the housing 10 is supplied to the developing roller 20 via the supply roller 30.

<2-4. Gear Portion>

The gear portion 40 is positioned at the first end face 11 of the housing 10. The gear portion 40 includes a gear cover 41, a coupling 42, and a plurality of gears. The gear cover 41 is attached to the first end face 11 of the housing 10. More specifically, the gear cover 41 is fixed to the first end face 11 of the housing 10 by a screw.

The plurality of gears includes the developing roller gear and the supply roller gear described above. Each of the coupling 42 and the plurality of gears is rotatable about its axis extending in the first direction. At least a part of the plurality of gears is positioned between the first end face 11 and the gear cover 41 in the first direction. That is, at least a part of the plurality of gears is covered by the gear cover 41.

The coupling 42 is exposed to an outside through the gear cover 41. When the drum unit 2 to which the developing cartridges 1 are attached is attached to the main frame 101, a driving shaft of the image forming apparatus 100 is coupled to the coupling 42 of the corresponding developing cartridge 1. In this state, a rotational force of the driving shaft is transmitted to the corresponding coupling 42 to rotate the same, and a rotational force of the coupling 42 is transmitted to the plurality of gears.

<2-5. Memory Assembly>

The memory assembly 50 is positioned at the second end face 12 of the housing 10. As illustrated in FIG. 3, the memory assembly 50 includes a memory 51, a holder 52, and a holder cover 53.

The memory 51 is a storage medium configured to store therein information related to the developing cartridge 1. The memory 51 is an IC chip, for example. For example, information related to a specification of the developing cartridge 1 or information related to a lifetime of the developing cartridge 1 is stored in the memory 51. The memory 51 has an electrical contact surface 511.

The electrical contact surface 511 is electrically connected to a memory cell of the memory 51. The electrical contact surface 511 is positioned at one end portion in the second direction of the holder 52. In the present embodiment, the memory 51 having the electrical contact surface 511 is held by the one end portion in the second direction of the holder 52. However, of components configuring the memory 51, only the electrical contact surface 511 may be held by the holder 52, and the memory cell of the memory 51 may be held by a portion the developing cartridge 1 other than the holder 52.

The holder cover 53 is attached to the second end face 12 of the housing 10. At least a part of the holder 52 is covered by the holder cover 53. The holder 52 is positioned between the second end face 12 of the housing 10 and the holder cover 53 in the first direction. The holder 52 is movable relative to the housing 10 and the holder cover 53 in the first direction, in the second direction, and in the third direction. Hence, the electrical contact surface 511 of the memory 51 is also movable relative to the housing 10 and the holder cover 53 in the first direction, in the second direction, and in the third direction.

3. CONFIGURATION OF DRUM UNIT

Figure 5:
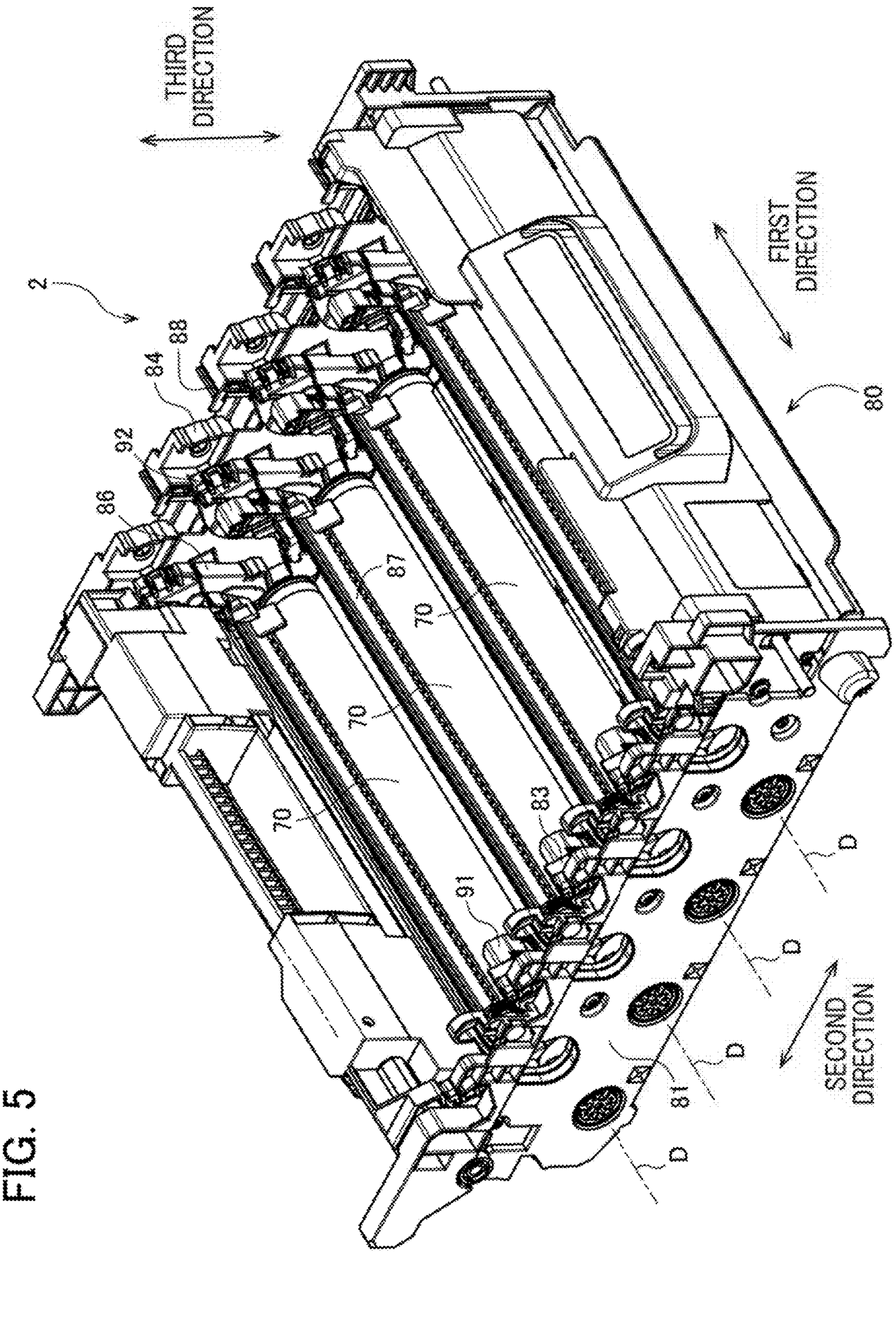
FIG. 5 is a perspective view of a drum unit.

FIG. 5 is a perspective view of the drum unit 2. As illustrated in FIG. 5, the drum unit 2 includes four photosensitive drums 70, a drum frame 80, the four first pressure members 91, and the four second pressure members 92.

<3-1. Photosensitive Drums>

Each of the photosensitive drums 70 is a drum rotatable about a drum axis D extending in the first direction. Each of the photosensitive drums 70 is positioned at one end portion in the third direction of the drum frame 80. Each of the photosensitive drums 70 has a hollow cylindrical outer circumferential surface centered on the drum axis D. The outer circumferential surface of each photosensitive drum 70 is coated with photosensitive material.

The four photosensitive drums 70 are arranged in the second direction. For example, the four photosensitive drums 70 are arranged in the second direction in the order of the photosensitive drum 70 corresponding to toner of yellow, the photosensitive drum 70 corresponding to toner of magenta, the photosensitive drum 70 corresponding to toner of cyan, and the photosensitive drum 70 corresponding to toner of black.

The photosensitive drum 70 corresponding to toner of yellow and the photosensitive drum 70 corresponding to toner of magenta are arranged to be spaced apart from each other in the second direction. The photosensitive drum 70 corresponding to toner of magenta and the photosensitive drum 70 corresponding to toner of cyan are arranged to be spaced apart from each other in the second direction. The photosensitive drum 70 corresponding to toner of cyan and the photosensitive drum 70 corresponding to toner of black are arranged to be spaced apart from each other in the second direction.

<3-2. Drum Frame>

The drum frame 80 supports the four photosensitive drums 70 such that the four photosensitive drums 70 are rotatable about their drum axes D. The drum frame 80 includes a first side frame 81, a first metal plate 82, first guide frames 83, a second side frame 84, a second metal plate 85, second guide frames 86, and connection frames 87. Each of the first guide frames 83 is an example of the "guide frame" and the "another guide frame". Each of the second guide frames 86 is also an example of the "guide frame" and the "another guide frame".

The first side frame 81, the first metal plate 82, and the first guide frames 83 are positioned at one end portion in the first direction of the drum frame 80. The first side frame 81 and the first guide frames 83 are made of resin. The first metal plate 82 is made of metal whose rigidity is greater than resin.

The first metal plate 82 extends both in the second direction and the third direction. The first side frame 81 is fixed to an outer surface in the first direction of the first metal plate 82. The first guide frames 83 are fixed to an inner surface in the first direction of the first metal plate 82.

The second side frame 84, the second metal plate 85, and the second guide frames 86 are positioned at another end portion in the first direction of the drum frame 80. The second side frame 84 and the second guide frames 86 are made of resin. The second metal plate 85 is made of metal whose rigidity is greater than resin.

The second metal plate 85 extends both in the second direction and the third direction. The second side frame 84 is fixed to an outer surface in the first direction of the second metal plate 85. The second guide frames 86 are fixed to an inner surface in the second direction of the second metal plate 85.

Note that "the inner surface in the first direction of the first metal plate 82" denotes a surface of the first metal plate 82 that faces the developing cartridges 1 in a state where the developing cartridges 1 are attached to the drum unit 2, whereas "the outer surface in the first direction of the first metal plate 82" denotes a surface of the first metal plate 82 that is an opposite surface of the inner surface in the first direction of the first metal plate 82. The same can be applied to the second metal plate 85. With this arrangement, the inner surface in the first direction of the first metal plate 82 and an inner surface in the first direction of the second metal plate 85 face each other in the first direction. The first metal plate 82 and the second metal plate 85 are each an example of the "metal plate".

The connection frames 87 connect the corresponding first guide frames 83 and second guide frames 86 to each other in the first direction.

The four developing cartridges 1 are attachable to the drum frame 80. In a state where the developing cartridges 1 are attached to the drum frame 80, the housing 10 of each developing cartridge 1 is positioned between the first metal plate 82 and the second metal plate 85 in the first direction. Also, in a state where the developing cartridges 1 are attached to the drum frame 80, the developing roller 20 of each developing cartridge 1 and the corresponding photosensitive drum 70 contact each other. Specifically, the outer circumferential surface of the developing roller 20 and the outer circumferential surface of the corresponding photosensitive drum 70 contact each other. Accordingly, toner carried on the outer circumferential surface of the developing roller 20 can be supplied to the photosensitive drum 70.

Figure 6:
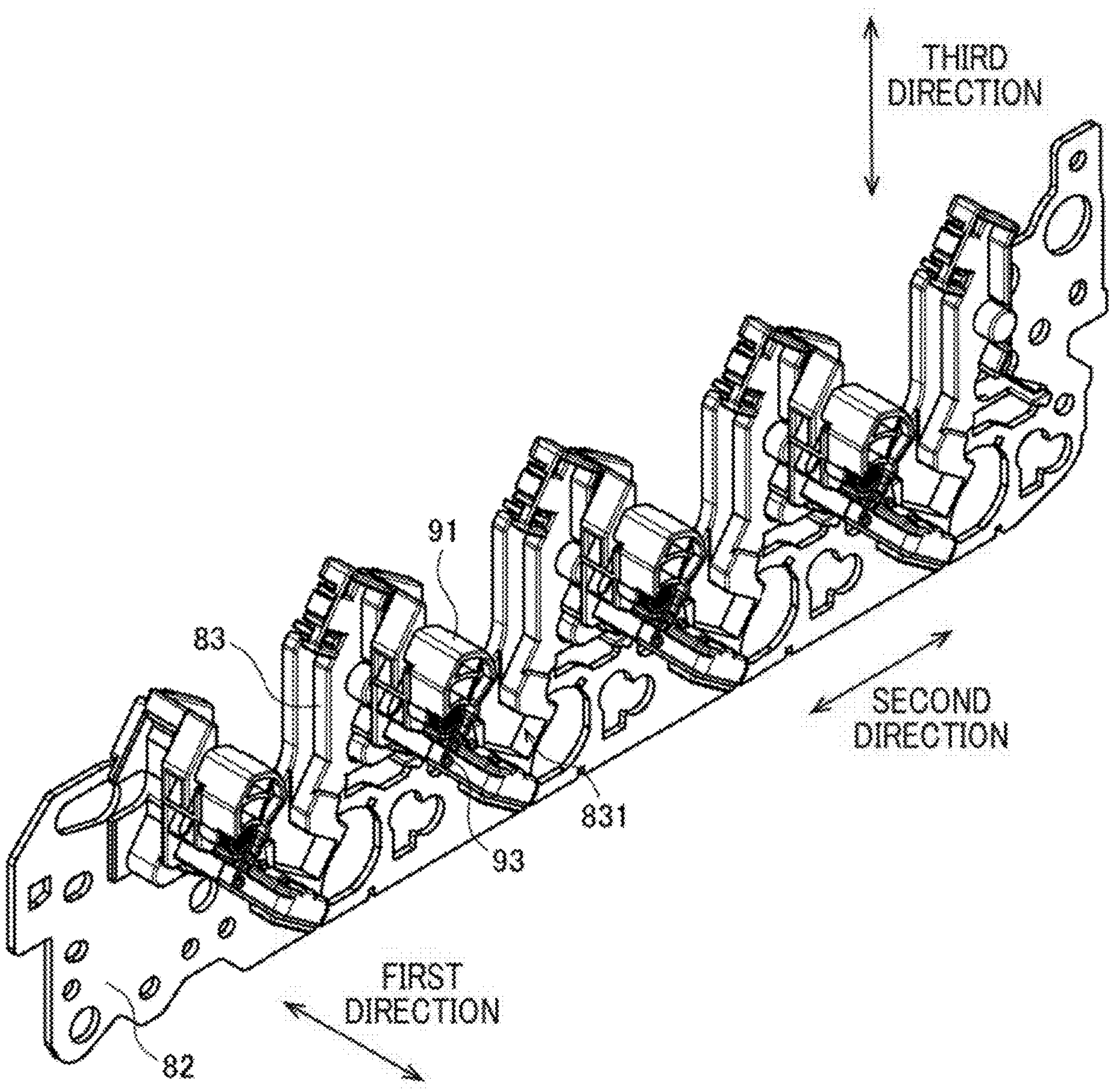
FIG. 6 is a perspective view of a first metal plate, first guide frames, and first pressure members.
Figure 7:
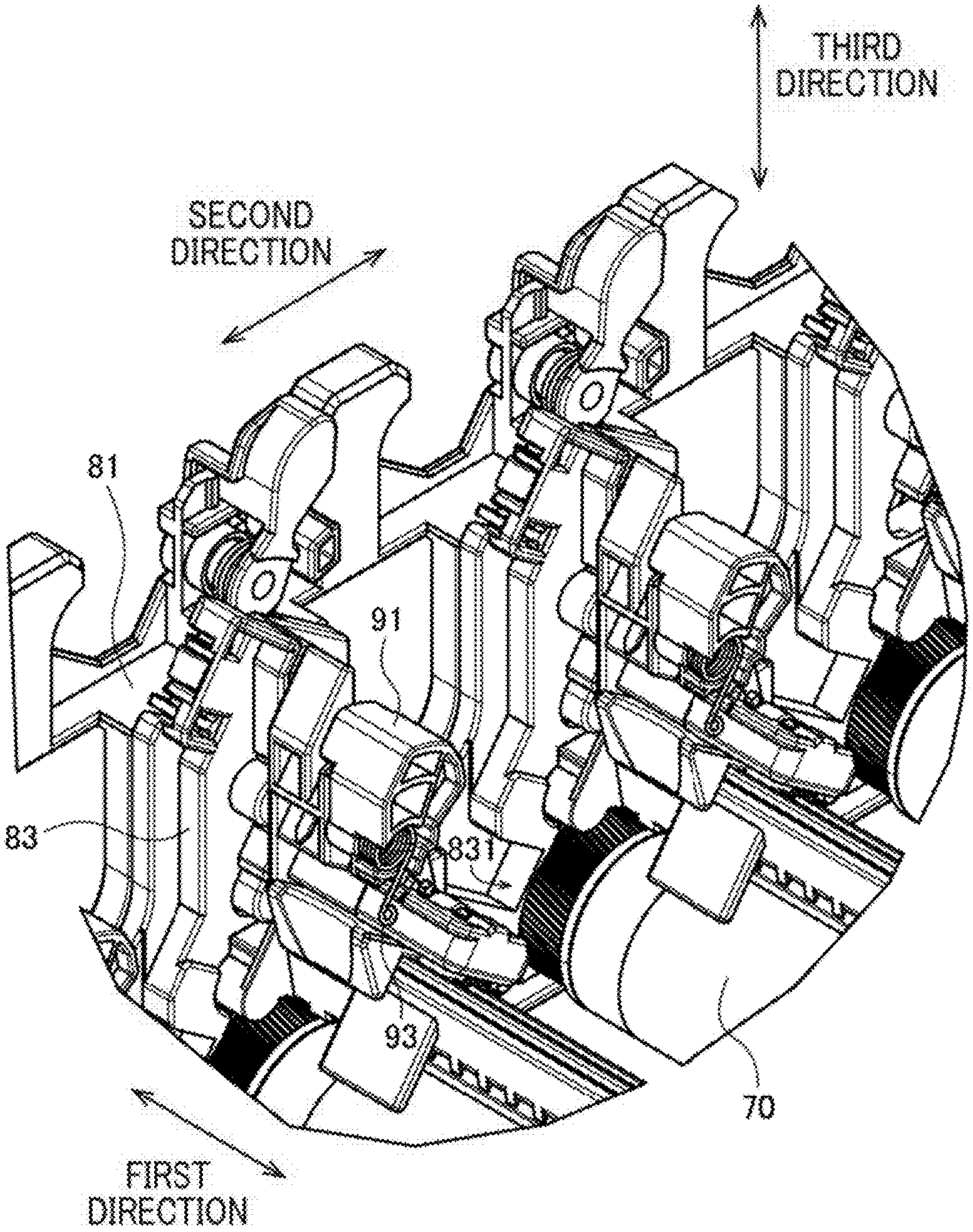
FIG. 7 is a partial perspective view of the drum unit illustrating a portion in the vicinity of the first pressure member.

FIG. 6 is a perspective view of the first metal plate 82, the first guide frames 83, and the first pressure members 91. FIG. 7 is a partial perspective view of the drum unit 2 illustrating a portion in the vicinity of the first pressure member 91. As illustrated in FIGS. 6 and 7, each of the first guide frames 83 includes a first guide groove 831. Each of the first guide grooves 831 is an example of the "guide groove".

Each of the first guide grooves 831 is recessed toward the corresponding photosensitive drum 70 in a direction in which the photosensitive drum 70 and the developing roller 20 contact each other. When the developing cartridge 1 is attached to the drum frame 80, a portion of the developing cartridge 1 is inserted in the corresponding first guide groove 831. More specifically, the first collar 23 of the developing cartridge 1 is inserted in the corresponding first guide groove 831. Accordingly, the developing cartridge 1 is guided relative to the drum frame 80 by the first guide groove 831.

Figure 8:
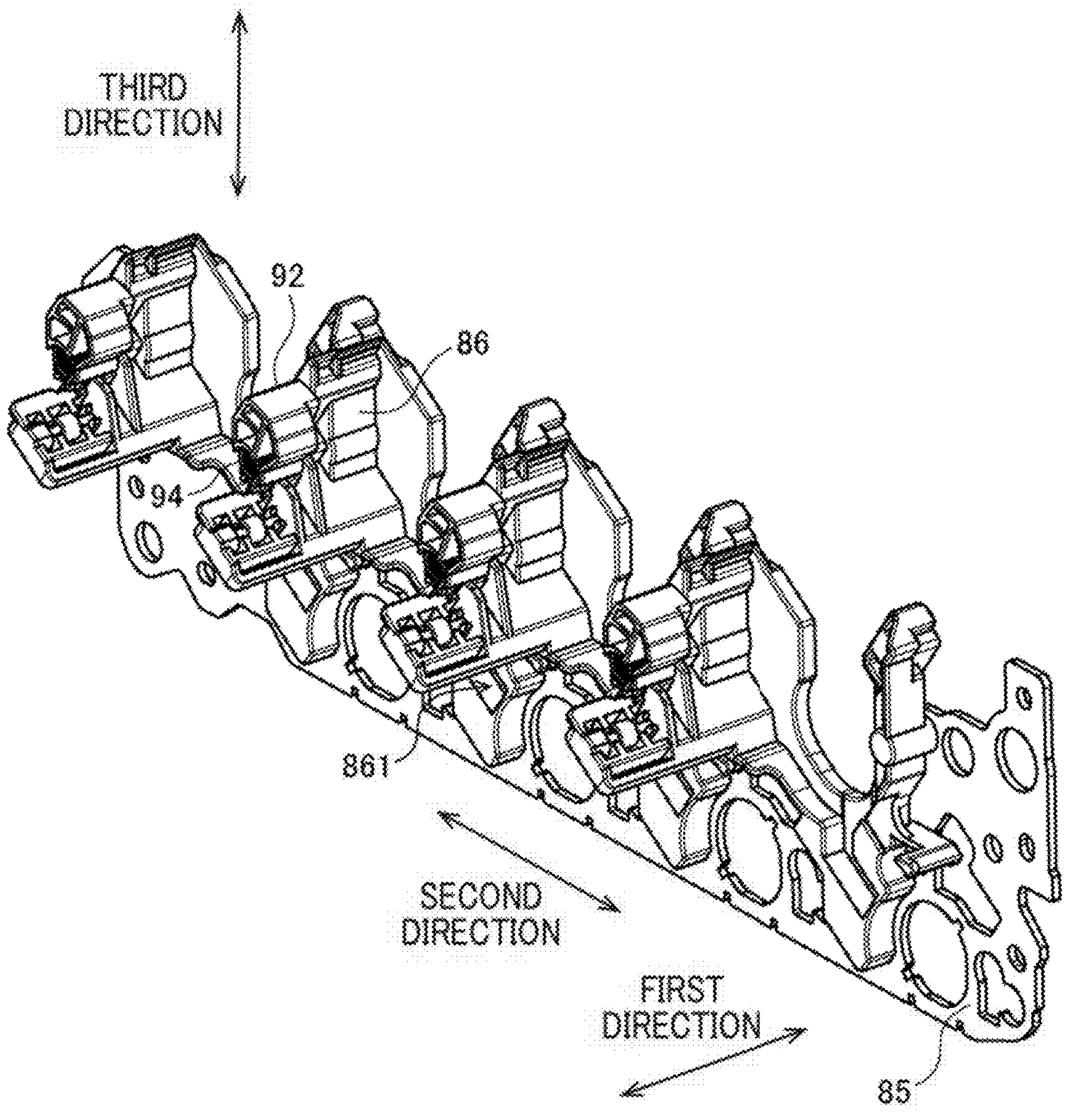
FIG. 8 is a perspective view of a second metal plate, second guide frames, and second pressure members.
Figure 9:
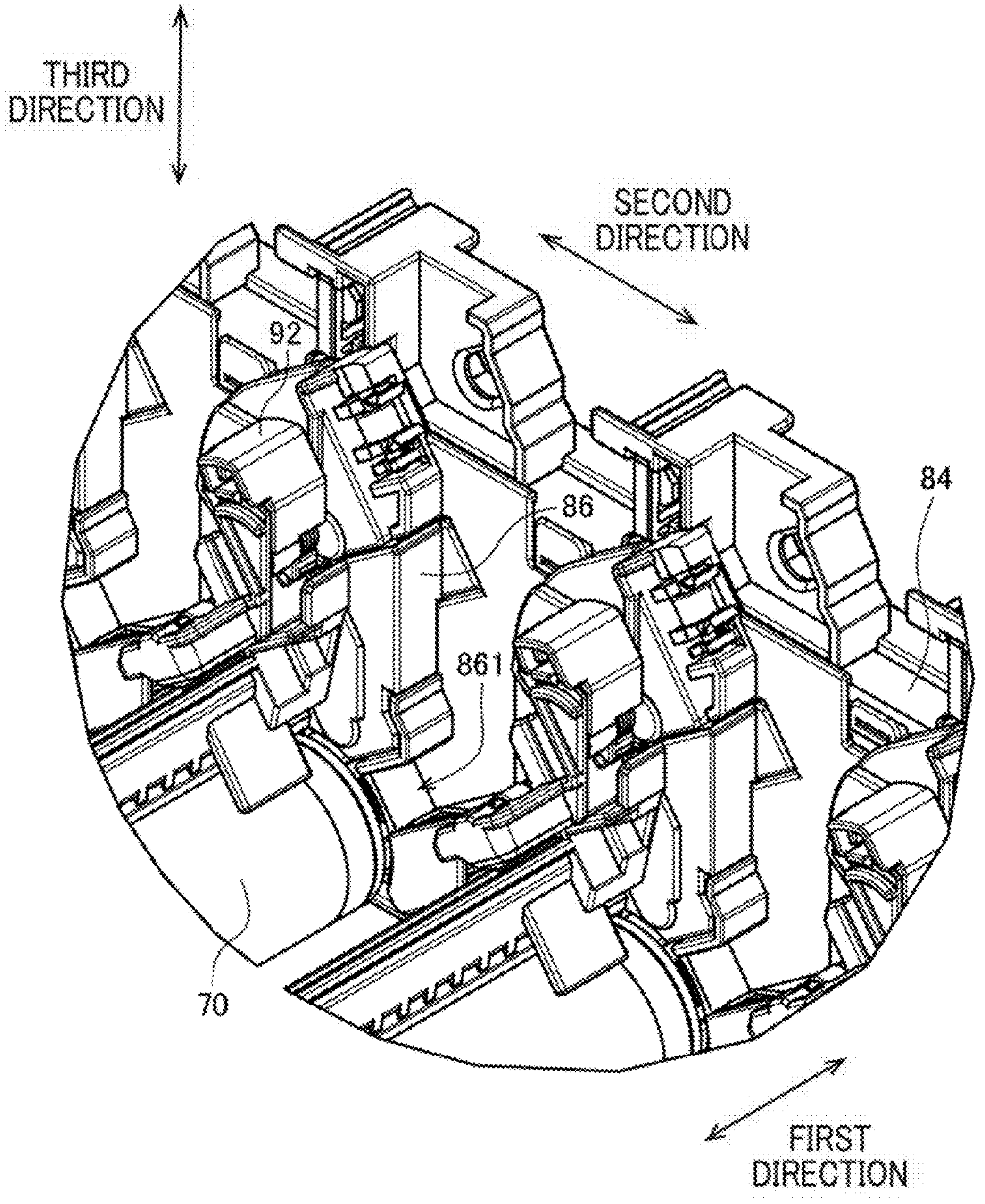
FIG. 9 is a partial perspective view of the drum unit illustrating a portion in the vicinity of the second pressure member.

FIG. 8 is a perspective view of the second metal plate 85, the second guide frames 86, and the second pressure members 92. FIG. 9 is a partial perspective view of the drum unit 2 illustrating a portion in the vicinity of the second pressure member 92. As illustrated in FIGS. 8 and 9, each of the second guide frames 86 has a second guide groove 861. Each of the second guide grooves 861 is also an example of the "guide groove".

Each of the second guide grooves 861 is recessed toward the corresponding photosensitive drum 70 in a direction in which the photosensitive drum 70 and the developing roller 20 contact each other. When the developing cartridge 1 is attached to the drum frame 80, a portion of the developing cartridge 1 is inserted in the corresponding second guide groove 861. More specifically, the second collar 24 of the developing cartridge 1 is inserted in the corresponding second guide groove 861. Accordingly, the developing cartridge 1 is guided relative to the drum frame 80 by the second guide groove 861.

The drum frame 80 also includes electrical contacts 88. The electrical contacts 88 are attached to the second side frame 84. In a state where the developing cartridges 1 are attached to the drum frame 80, the electrical contact surfaces 511 in the memories 51 of the developing cartridges 1 contact the corresponding electrical contacts 88. As a result, the memories 51 and the corresponding electrical contacts 88 are electrically connected to each other.

Also, in a state where the drum frame 80 to which the developing cartridges 1 are attached is attached to the main frame 101, the electrical contacts 88 are electrically connected to a controller of the image forming apparatus 100. This electrical connection enables the controller of the image forming apparatus 100 to perform at least one of reading information from the memories 51 and writing information in the memories 51.

<3-3. First Pressure Members and Second Pressure Members>

The first pressure members 91 and the second pressure members 92 are components for pressing the respective developing cartridges 1 toward the photosensitive drums 70 corresponding thereto in a state where the developing cartridges 1 are attached to the drum frame 80.

The first pressure members 91 are positioned at the corresponding first guide frames 83. The first pressure members 91 are positioned inward relative to the first guide grooves 831 of the corresponding first guide frames 83 in the first direction. That is, the first pressure members 91 are positioned between the first guide grooves 831 and the second guide grooves 861 in the first direction.

In a state where the developing cartridges 1 are attached to the drum frame 80, the first pressure members 91 are positioned outward relative to the outer circumferential surfaces of the supply roller bodies 31 of the developing cartridges 1 in the first direction. Also, in a state where the developing cartridges 1 are attached to the drum frame 80, the first pressure members 91 are positioned outward relative to the blades 25 of the developing cartridges 1 in the first direction. Accordingly, the first pressure members 91 are positioned outward in the first direction relative to a region in which toner is supplied from the developing roller 20 to the photosensitive drum 70. Each of the first pressure members 91 is an example of the "pressure member" and the "another pressure member".

In a state where the developing cartridges 1 are attached to the drum frame 80, each of the first pressure members 91 faces the housing 10 of the corresponding developing cartridge 1 in the second direction. Specifically, in a state where the developing cartridges 1 are attached to the drum frame 80, each first pressure member 91 faces the second outer surface 17 of the housing 10 of the corresponding developing cartridge 1 in the second direction. More specifically, in a state where the developing cartridges 1 are attached to the drum frame 80, each first pressure member 91 faces the first protrusion 182 of the corresponding developing cartridge 1 in the second direction.

Figure 10:
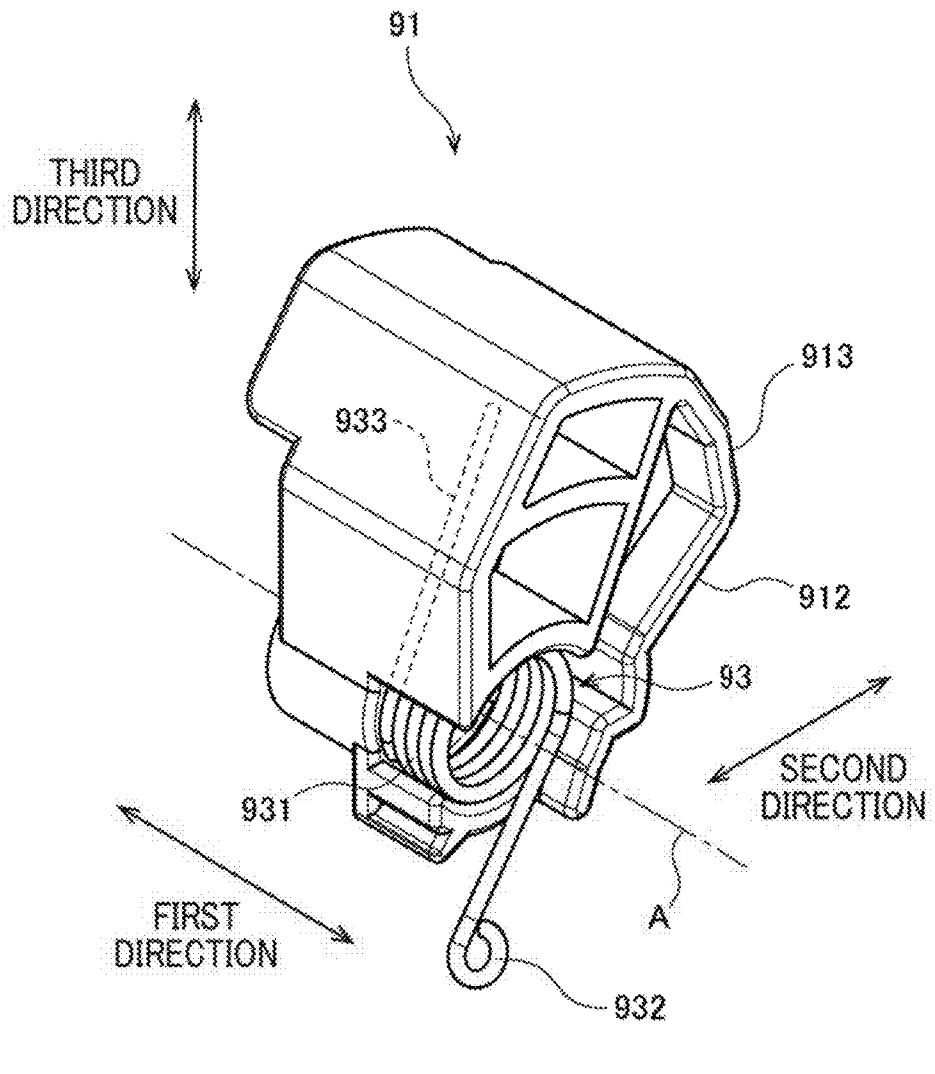
FIG. 10 is a perspective view of the first pressure member.
Figure 11:
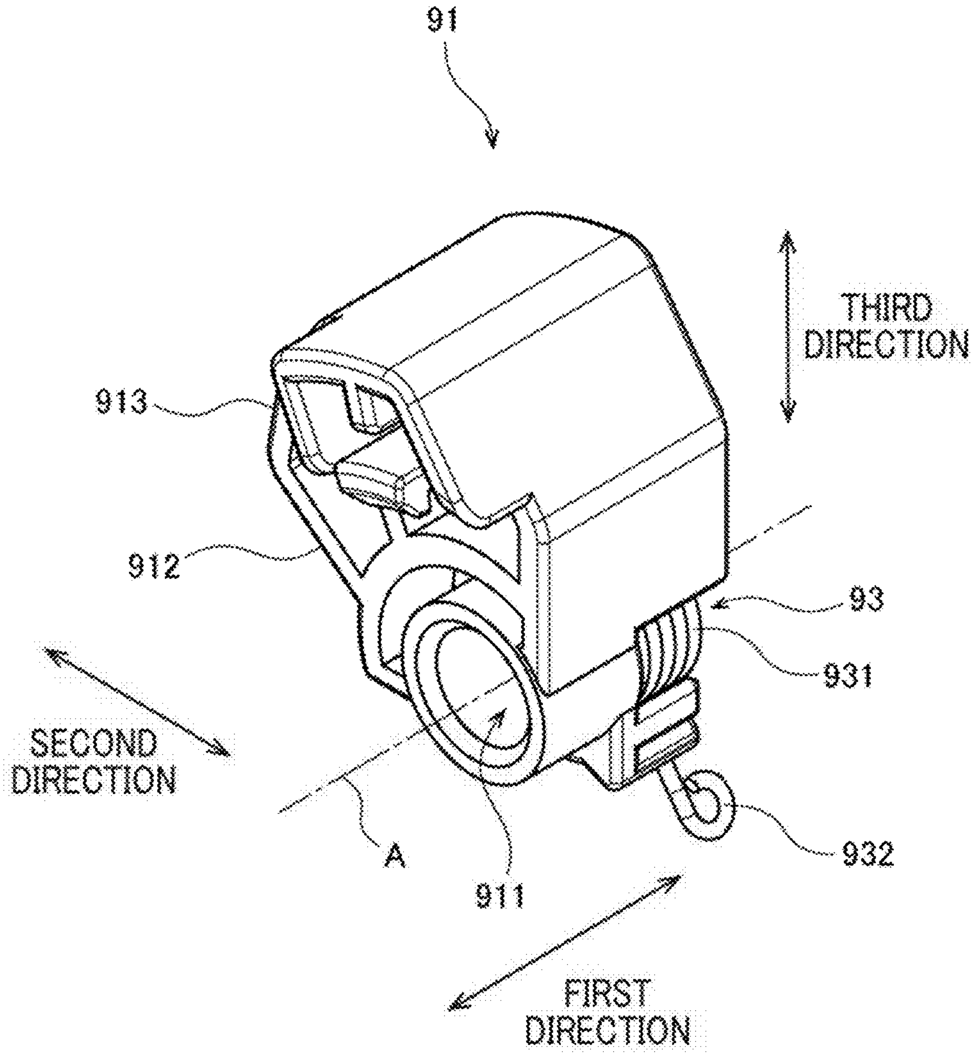
FIG. 11 is another perspective view of the first pressure member.

FIGS. 10 and 11 are perspective views of the first pressure member 91. As illustrated in FIG. 11, the first pressure member 91 has a first hole 911. The first hole 911 is a through-hole having a circular shape and extending in the first direction. In the meantime, each of the first guide frames 83 includes a first shaft (not illustrated). The first shaft is a part having a circular columnar shape and extending in the first direction. The first shaft is inserted through the first hole 911. Accordingly, the first pressure member 91 is pivotally movable about the first shaft. That is, the first pressure member 91 is pivotally movable about a pressure axis A extending in the first direction.

The first pressure member 91 is pivotally movable between a pressure position (FIG. 13) and a retracted position about the pressure axis A. The first pressure member 91 in the retracted position is positioned farther from the photosensitive drum 70 than the first pressure member 91 in the pressure position is from the photosensitive drum 70. When the first pressure member 91 is placed in the pressure position in a state where the developing cartridge 1 is attached to the drum frame 80 (a state illustrated in FIG. 13), the first pressure member 91 contacts the developing cartridge 1.

The drum unit 2 further includes first elastic members 93. Each of the first elastic members 93 is a spring configured to expand and contract in a pivot direction about the pressure axis A. The first elastic member 93 is a torsion coil spring, for example. The first elastic member 93 has a spiral-shaped coil portion 931, and two leg portions 932 and 933 extending outward from the coil portion 931. The first shaft is inserted through the coil portion 931. One leg portion 932 is in contact with the first guide frame 83. The other leg portion 933 is in contact with the first pressure member 91. The first elastic member 93 constantly urges the first pressure member 91 from the retracted position toward the pressure position by an elastic force thereof. Each of the first elastic members 93 is an example of the "elastic member".

Figure 12:
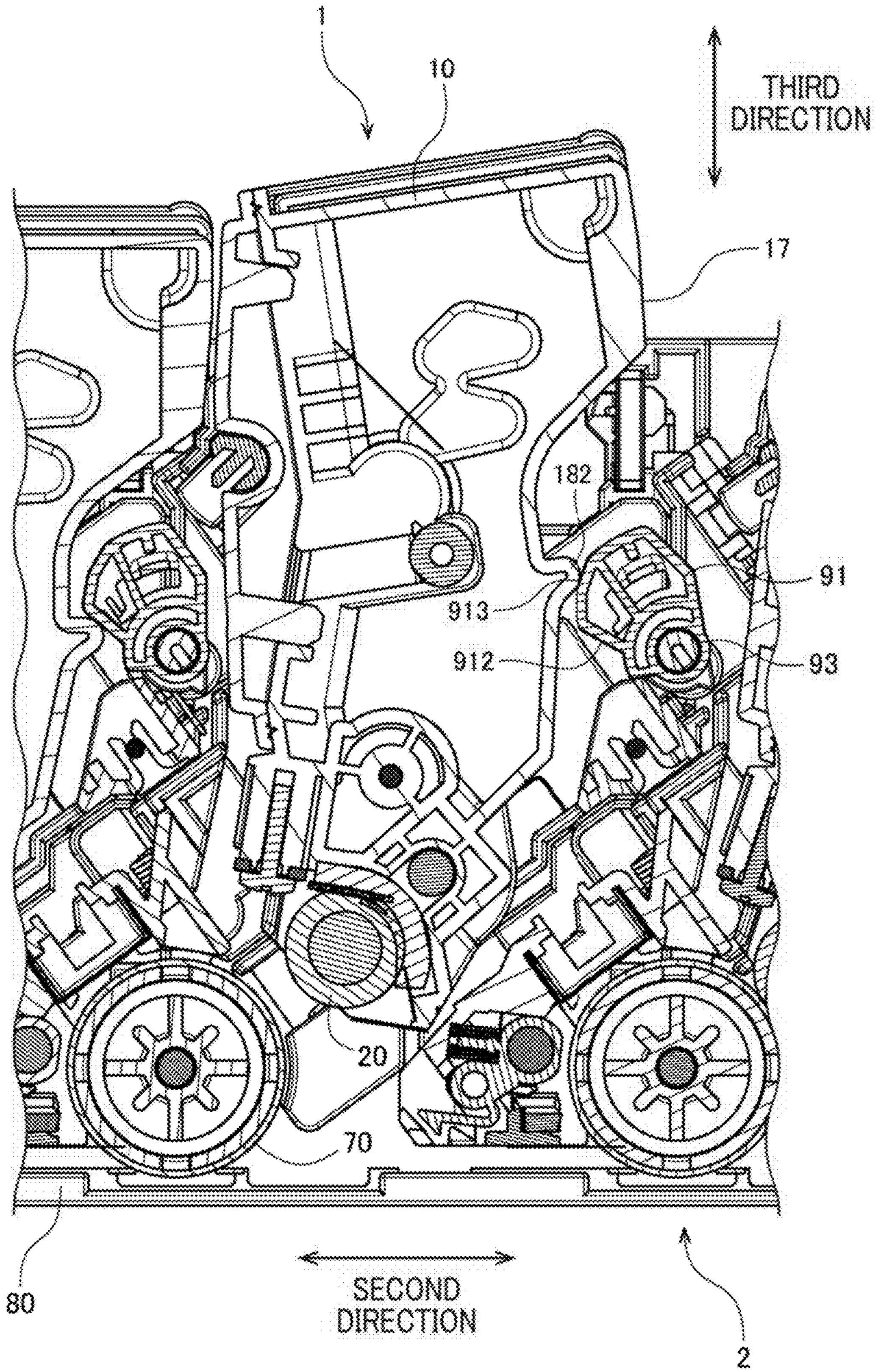
FIG. 12 is a cross-sectional view of the drum unit and the developing cartridge, and illustrating a state where the developing cartridge is in the course of being attached to the drum unit or the developing cartridge is in the course of being detached from the drum unit.
Figure 13:
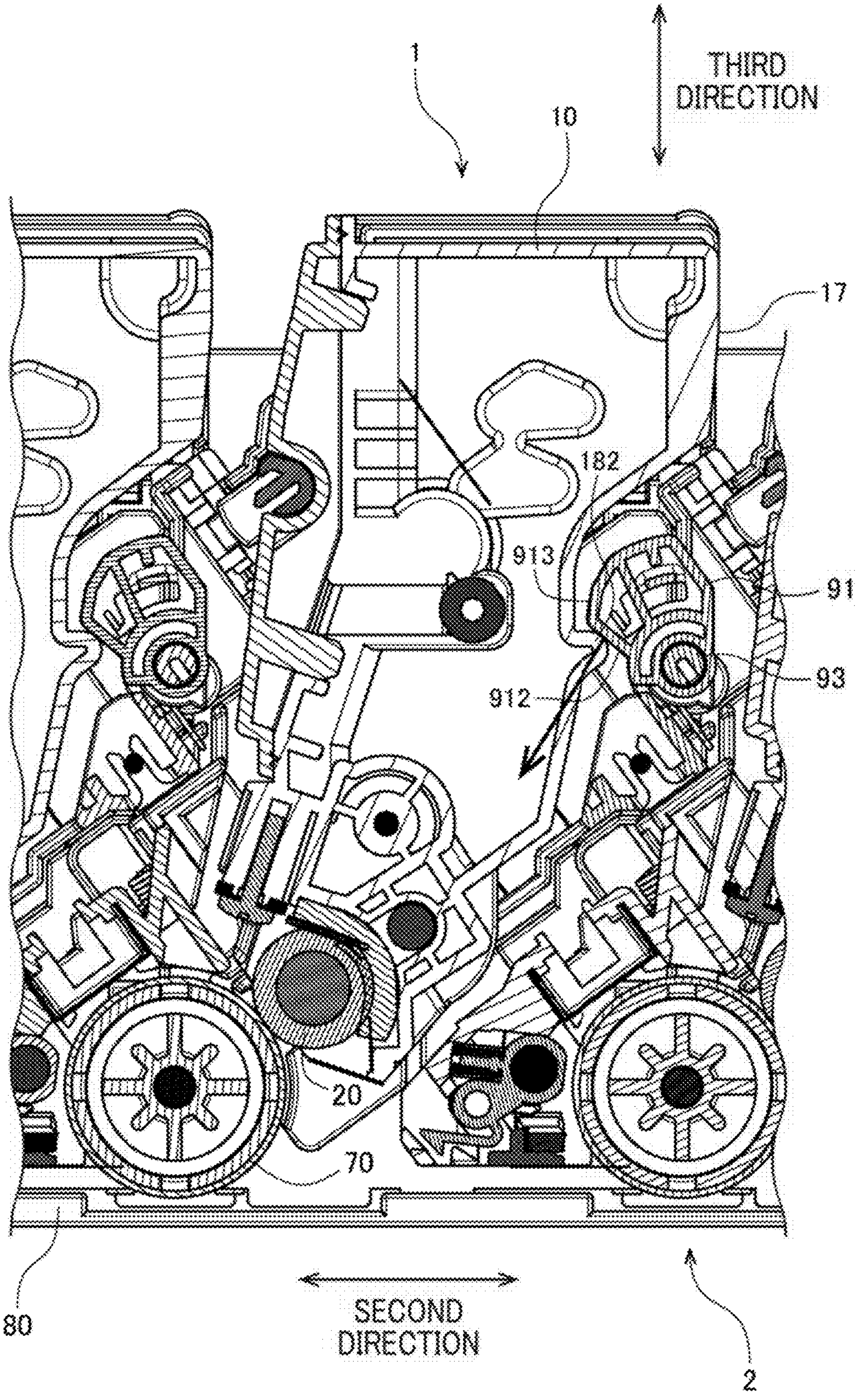
FIG. 13 is a cross-sectional view of the drum unit and the developing cartridge, and illustrating a state where the developing cartridge has been attached to the drum unit.

FIG. 12 is a cross-sectional view of the drum unit 2 and the developing cartridge 1, and illustrating a state where the developing cartridge 1 is in the course of being attached to the drum unit 2 or the developing cartridge 1 is in the course of being detached from the drum unit 2. FIG. 13 is a cross-sectional view of the drum unit 2 and the developing cartridge 1, and illustrating a state where the developing cartridge 1 has been attached to the drum unit 2. Note that FIGS. 12 and 13 illustrate a cross-section of the drum unit 2 and the developing cartridge 1 taken along a plane that is orthogonal to the first direction and passes through the first pressure member 91.

As illustrated in FIGS. 10 to 13, the first pressure member 91 has a pressure surface 912. The pressure surface 912 is a surface crossing a circumferential direction about the pressure axis A. As illustrated in FIG. 13, in a state where the developing cartridge 1 is attached to the drum frame 80, the pressure surface 912 is in contact with the housing 10 of the developing cartridge 1. Specifically, in a state where the developing cartridge 1 is attached to the drum frame 80, the pressure surface 912 is in contact with the second outer surface 17 of the housing 10. More specifically, in a state where the developing cartridge 1 is attached to the drum frame 80, the pressure surface 912 is in contact with the first protrusion 182.

As illustrated in FIGS. 10 to 13, the first pressure member 91 also has a guide surface 913. The guide surface 913 is positioned farther from the photosensitive drum 70 than the pressure surface 912 is from the photosensitive drum 70 in the third direction. The guide surface 913 is inclined relative to the pressure surface 912.

As illustrated in FIG. 12, in a process of attachment of the developing cartridge 1 to the drum frame 80, the housing 10 of the developing cartridge 1 contacts the guide surface 913. Specifically, in the process of the attachment of the developing cartridge 1 to the drum frame 80, the second outer surface 17 of the housing 10 contacts the guide surface 913. More specifically, in the process of the attachment of the developing cartridge 1 to the drum frame 80, the first protrusion 182 contacts the guide surface 913. This contact of the first protrusion 182 with the guide surface 913 causes the first pressure member 91 to move from the pressure position toward the retracted position during the process of the attachment of the developing cartridge 1 to the drum frame 80.

The second pressure members 92 are positioned at the corresponding second guide frames 86. The second pressure members 92 are positioned inward relative to the second guide grooves 861 of the corresponding second pressure members 92 in the first direction. That is, the second pressure members 92 are positioned between the first guide grooves 831 and the second guide grooves 861 in the first direction. Also, the second pressure members 92 are positioned inward relative to the electrical contacts 88 in the first direction. That is, the second pressure members 92 are positioned between the electrical contacts 88 and the first guide frames 83 in the first direction.

In a state where the developing cartridges 1 are attached to the drum frame 80, the second pressure members 92 are positioned outward relative to the outer circumferential surfaces of the supply roller bodies 31 in the developing cartridges 1 in the first direction. Also, in a state where the developing cartridges 1 are attached to the drum frame 80, the second pressure members 92 are positioned outward relative to the blades 25 of the developing cartridges 1 in the first direction. That is, the second pressure members 92 are positioned outward in the first direction relative to a region in which toner is supplied from the developing roller 20 to the photosensitive drum 70. Each of the second pressure members 92 is also an example of the "pressure member" and the "another pressure member".

In a state where the developing cartridges 1 are attached to the drum frame 80, each of the second pressure members 92 faces the housing 10 of the corresponding developing cartridge 1 in the second direction. Specifically, in a state where the developing cartridges 1 are attached to the drum frame 80, each second pressure member 92 faces the second outer surface 17 of the housing 10 of the corresponding developing cartridge 1 in the second direction. More specifically, in a state where the developing cartridges 1 are attached to the drum frame 80, each second pressure member 92 faces the second protrusion 192 of the corresponding developing cartridge 1 in the second direction.

Although not illustrated in the drawings in detail, each of the second pressure members 92 has a shape and a configuration similar to those of the first pressure member 91.

Specifically, similar to the first pressure member 91, the second pressure member 92 has a second hole. The second hole is a through-hole having a circular shape and extending in the first direction. In the meantime, each of the second guide frames 86 includes a second shaft (not illustrated). The second shaft is a part having a circular columnar shape and extending in the first direction. The second shaft is inserted through the second hole. Accordingly, the second pressure member 92 is pivotally movable about the second shaft. That is, the second pressure member 92 is pivotally movable about a pressure axis A extending in the first direction.

The second pressure member 92 is pivotally movable about the pressure axis A between a pressure position and a retracted position. The second pressure member 92 in the retracted position is positioned farther from the photosensitive drum 70 than the second pressure member 92 in the pressure position is from the photosensitive drum 70. When the second pressure member 92 is placed in the pressure position in a state where the developing cartridge 1 is attached to the drum frame 80, the second pressure member 92 contacts the developing cartridge 1.

The drum unit 2 further includes second elastic members (not illustrated) having a similar configuration to the first elastic members 93. Each of the second elastic members is a spring configured to expand and contract in a pivot direction about the pressure axis A. The second elastic member is a torsion coil spring, for example. The second elastic member has a spiral-shaped coil portion, and two leg portions extending outward from the coil portion. The second shaft is inserted through the coil portion. One of the two leg portions is in contact with the second guide frame 86. The other of the two leg portions is in contact with the second pressure member 92. The second elastic member constantly urges the second pressure member 92 from the retracted position toward the pressure position by an elastic force thereof. Each of the second elastic members is also an example of the "elastic member".

Further, the second pressure member 92 has a pressure surface similar to the first pressure member 91. The pressure surface is a surface crossing a circumferential direction about the pressure axis A. In a state where the developing cartridge 1 is attached to the drum frame 80, the pressure surface is in contact with the housing 10 of the developing cartridge 1. Specifically, in a state where the developing cartridge 1 is attached to the drum frame 80, the pressure surface is in contact with the second outer surface 17 of the housing 10. More specifically, in a state where the developing cartridge 1 is attached to the drum frame 80, the pressure surface is in contact with the second protrusion 192.

The second pressure member 92 also has a guide surface similar to the first pressure member 91. The guide surface is positioned farther from the photosensitive drum 70 than the pressure surface is from the photosensitive drum 70 in the third direction. The guide surface is inclined relative to the pressure surface.

In the process of the attachment of the developing cartridge 1 to the drum frame 80, the housing 10 of the developing cartridge 1 contacts the guide surface. Specifically, in the process of the attachment of the developing cartridge 1 to the drum frame 80, the second outer surface 17 of the developing cartridge 1 contacts the guide surface. More specifically, in the process of the attachment of the developing cartridge 1 to the drum frame 80, the second protrusion 192 contacts the guide surface. This contact between the second protrusion 192 with the guide surface causes the second pressure member 92 to move from the pressure position toward the retracted position during the process of the attachment of the developing cartridge 1 to the drum frame 80.

4. ATTACHMENT AND DETACHMENT OF DEVELOPING CARTRIDGE TO AND FROM DRUM UNIT

Next, operations for attaching and detaching the developing cartridge 1 to and from the drum unit 2 will be described while referring to FIGS. 12 and 13.

In a state where the developing cartridges 1 are not attached to the drum unit 2, each of the first pressure members 91 is at the pressure position by the elastic force of the corresponding first elastic member 93. Similarly, in a state where the developing cartridges 1 are not attached to the drum unit 2, each of the second pressure members 92 is at the pressure position by the elastic force of the corresponding second elastic member.

In order to attach the developing cartridge 1 to the drum unit 2, the developing cartridge 1 is moved toward the photosensitive drum 70 of the drum unit 2 in the third direction. Accordingly, as illustrated in FIG. 12, the first protrusion 182 of the developing cartridge 1 is brought into contact with the first pressure member 91. Specifically, the first protrusion 182 is brought into contact with the guide surface 913 of the first pressure member 91. Similarly, the second protrusion 192 is brought into contact with the second pressure member 92. Specifically, the second protrusion 192 is brought into contact with the guide surface of the second pressure member 92.

As the developing cartridge 1 is further moved toward the photosensitive drum 70 from the state illustrated in FIG. 12, the first protrusion 182 moves along the guide surface 913 and presses the first pressure member 91. Consequently, the first pressure member 91 pivotally moves from the pressure position to the retracted position against the elastic force of the first elastic member 93. Similarly, as the developing cartridge 1 is further moved toward the photosensitive drum 70, the second protrusion 192 moves along the guide surface and presses the second pressure member 92. Consequently, the second pressure member 92 pivotally moves from the pressure position to the retracted position against the elastic force of the second elastic member.

Thereafter, when the first protrusion 182 moves to reach the pressure surface 912 of the first pressure member 91, the pressure surface 912 presses the first protrusion 182 toward the photosensitive drum 70 in a direction indicated by an arrow illustrated in FIG. 13 due to the elastic force of the first elastic member 93. Similarly, when the second protrusion 192 moves to reach the pressure surface of the second pressure member 92, the pressure surface presses the second protrusion 192 toward the photosensitive drum 70 due to the elastic force of the second elastic member. As a consequence, the developing roller 20 contacts the photosensitive drum 70, and the attachment of the developing cartridge 1 to the drum unit 2 is completed.

After completion of the attachment of the developing cartridge 1 to the drum unit 2, the first pressure member 91 constantly presses the housing 10 of the developing cartridge 1 toward the photosensitive drum 70 by the elastic force of the first elastic member 93. Similarly, after the completion of the attachment of the developing cartridge 1 to the drum unit 2, the second pressure member 92 constantly presses the housing 10 of the developing cartridge 1 toward the photosensitive drum 70 by the elastic force of the second elastic member. Accordingly, the photosensitive drum 70 and the developing roller 20 are maintained in contact with each other.

In order to detach the developing cartridge 1 from the drum unit 2, the developing cartridge 1 is moved in a direction away from the photosensitive drum 70 of the drum unit 2 in the third direction from the state illustrated in FIG. 13. In accordance with the movement of the developing cartridge 1, the developing roller 20 separates away from the photosensitive drum 70.

At this time, the first protrusion 182 moves along the pressure surface 912 of the first pressure member 91. Then, since the first protrusion 182 presses the first pressure member 91, the first pressure member 91 pivotally moves from the pressure position to the retracted position against the elastic force of the first elastic member 93. Similarly, the second protrusion 192 moves along the pressure surface of the second pressure member 92. Then, since the second protrusion 192 presses the second pressure member 92, the second pressure member 92 pivotally moves from the pressure position to the retracted position against the elastic force of the second elastic member.

Thereafter, as the developing cartridge 1 is further moved in the direction away from the photosensitive drum 70 in the third direction, the first protrusion 182 moves from the pressure surface 912 of the first pressure member 91 toward the guide surface 913, and moves along the guide surface 913. Accordingly, the first protrusion 182 separates away from the first pressure member 91. Hence, the first pressure member 91 pivotally moves from the retracted position to the pressure position. Similarly, the second protrusion 192 moves from the pressure surface of the second pressure member 92 toward the guide surface, and moves along the guide surface. Consequently, the second protrusion 192 separates away from the second pressure member 92 to thereby pivotally move the second pressure member 92 from the retracted position to the pressure position.

As described above, according to the drum unit 2 in the present embodiment, the first pressure member 91 are positioned inward relative to the first guide grooves 831 in the first direction. This configuration can ensure a greater space for providing components other than the first pressure members 91 at the one end portion in the first direction of the drum frame 80. Also, according to the drum unit 2 in the present embodiment, the second pressure members 92 are positioned inward relative to the second guide grooves 861 in the first direction. Accordingly, a space for providing components other than the second pressure members 92 can be made greater at the other end portion in the first direction of the drum frame 80.

In the present embodiment, in a state where the developing cartridge 1 is attached to the drum frame 80, the first pressure member 91 presses a part of the housing 10 that is positioned inward relative to the first end face 11 and the second end face 12 in the first direction toward the photosensitive drum 70. Also, in the present embodiment, in a state where the developing cartridge 1 is attached to the drum frame 80, the second pressure member 92 presses a part of the housing 10 that is positioned inward relative to the first end face 11 and the second end face 12 in the first direction toward the photosensitive drum 70.

Accordingly, a space for providing other components can be made greater at the first end face 11 and the second end face 12 of the housing 10. As an example, a space at which the gear portion 40 is disposed can be made greater at the first end face 11 of the housing 10. Further, a space at which the memory assembly 50 is disposed can be made greater at the second end face 12 of the housing 10. Still further, a space at which the electrical contacts 88 are disposed can be made greater at the end portion in the first direction of the drum frame 80.

In the present embodiment, in a state where the developing cartridge 1 is attached to the drum frame 80, the first pressure member 91 presses the first protrusion 182 toward the photosensitive drum 70. Similarly, in the present embodiment, in a state where the developing cartridge 1 is attached to the drum frame 80, the second pressure member 92 presses the second protrusion 192 toward the photosensitive drum 70. With this configuration, a pressing force by the first pressure member 91 and the second pressure member 92 can be accurately directed toward the photosensitive drum 70.

Particularly in the present embodiment, the first pressure member 91 presses the housing 10 in a direction that is slightly closer to the third direction than the direction in which the photosensitive drum 70 and the developing roller 20 contact each other is to the third direction, as illustrated in FIG. 13. Similarly, the second pressure member 92 presses the housing 10 in the direction that is slightly closer to the third direction than the direction in which the photosensitive drum 70 and the developing roller 20 contact each other is to the third direction. This configuration can more reliably restrain unintentional detachment of the developing cartridge 1 from the drum unit 2.

5. MODIFICATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment described above, the four developing cartridges 1 are attachable to the drum unit 2. However, the drum unit 2 may be modified to receive one through three developing cartridges 1, or greater than or equal to five developing cartridges 1.

Further, the parts and the components appearing in the embodiment and the modifications described above may be combined or partially omitted as appropriate as long as any contradiction is avoided.

What is claimed is:

1. A drum unit comprising:

a photosensitive drum rotatable about a drum axis extending in a first direction;

a drum frame to which a developing cartridge including a developing roller is attachable, the drum frame including:

a guide frame positioned at one end portion in the first direction of the drum frame, the guide frame having a guide groove allowing a portion of the developing cartridge to be inserted therein; and a pressure member positioned at the guide frame at a position inward relative to the guide groove in the first direction, the pressure member being pivotally movable about a pressure axis extending in the first direction, the pressure member pressing the developing cartridge toward the photosensitive drum in a state where the developing cartridge is attached to the drum frame;

wherein the developing cartridge further includes:

a memory having an electrical contact surface, the drum unit further comprising:

an electrical contact in contact with the electrical contact surface in a state where the developing cartridge is attached to the drum frame, wherein the pressure member is positioned inward relative to the electrical contact in the first direction.

2. The drum unit according to claim 1, wherein the drum frame further includes:

a metal plate positioned at the one end portion in the first direction of the drum frame, and wherein the guide frame is fixed to an inner surface in the first direction of the metal plate.

3. The drum unit according to claim 1, wherein the pressure member is pivotally movable about the pressure axis between:

a pressure position, the pressure member in the pressure position being in contact with the developing cartridge in a state where the developing cartridge is attached to the drum frame; and a retracted position, the pressure member in the retracted position being positioned farther from the photosensitive drum than the pressure member in the pressure position is from the photosensitive drum, the drum unit further comprising:

an elastic member urging the pressure member from the retracted position toward the pressure position.

4. The drum unit according to claim 3, wherein the elastic member is a torsion coil spring.

5. The drum unit according to claim 1, wherein the developing cartridge further includes:

a housing configured to accommodate toner therein, and wherein, in a state where the developing cartridge is attached to the drum frame, the pressure member faces the housing in a second direction and presses the housing toward the photosensitive drum.

6. The drum unit according to claim 5, wherein the housing has a first end face and a second end face in the first direction, and wherein, in a state where the developing cartridge is attached to the drum frame, the pressure member presses a part of the housing that is positioned inward relative to the first end face and the second end face of the housing in the first direction toward the photosensitive drum.

7. The drum unit according to claim 5, wherein the housing includes:

a protrusion protruding in the second direction, and wherein, in a state where the developing cartridge is attached to the drum frame, the pressure member presses the protrusion toward the photosensitive drum.

8. The drum unit according to claim 5, wherein the pressure member has a pressure surface, the pressure surface being in contact with the housing in a state where the developing cartridge is attached to the drum frame.

9. The drum unit according to claim 8, wherein the photosensitive drum is positioned at one end portion of the drum frame in a third direction crossing both the first direction and the second direction, and wherein the pressure member further has a guide surface inclined relative to the pressure surface, the guide surface being positioned farther from the photosensitive drum than the pressure surface is from the photosensitive drum in the third direction, the guide surface contacting the housing during a process of attachment of the developing cartridge to the drum frame.

10. The drum unit according to claim 5, further comprising:

another photosensitive drum rotatable about another drum axis extending in the first direction, wherein the photosensitive drum and the another photosensitive drum are arranged in the second direction.

11. The drum unit according to claim 1, wherein the developing cartridge further includes:

a supply roller rotatable about a supply axis extending in the first direction, the supply roller having a hollow outer circumferential surface in contact with an outer circumferential surface of the developing roller, and wherein, in a state where the developing cartridge is attached to the drum frame, the pressure member is positioned outward relative to the outer circumferential surface of the supply roller in the first direction.

12. The drum unit according to claim 1, wherein the developing cartridge further includes:

a blade extending in the first direction and in contact with an outer circumferential surface of the developing roller, and wherein, in a state where the developing cartridge is attached to the drum frame, the pressure member is positioned outward relative to the blade in the first direction.

13. The drum unit according to claim 1, further comprising:

another guide frame positioned at another end portion of the drum frame in the first direction; and another pressure member provided at the another guide frame.

* * * * *